Elwood C. Kasper
INVENTOR.

July 31, 1962 E. C. KASPER 3,046,917
PLANTER SHOVEL COVERER CONTROLS
Filed Oct. 15, 1959 3 Sheets-Sheet 2
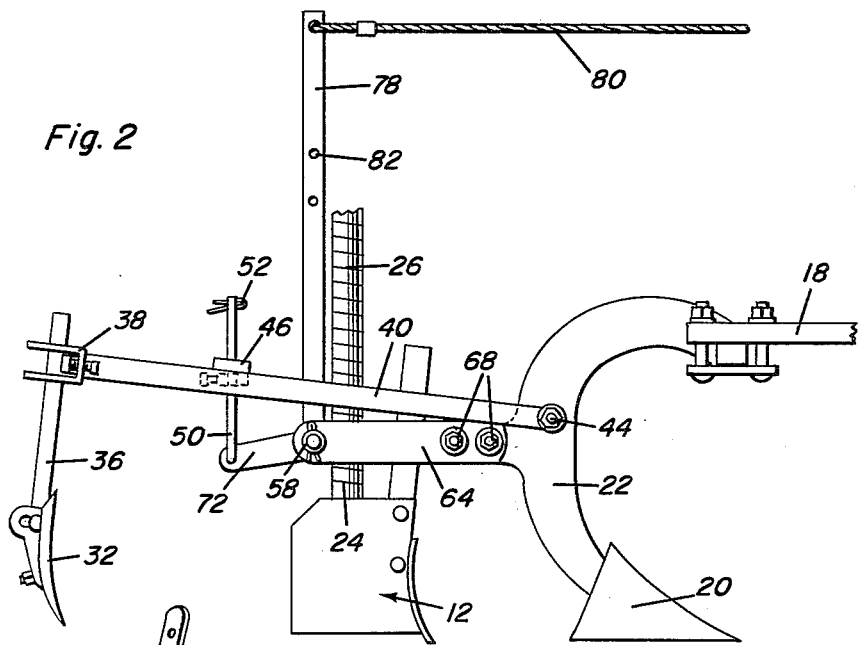
Fig. 2
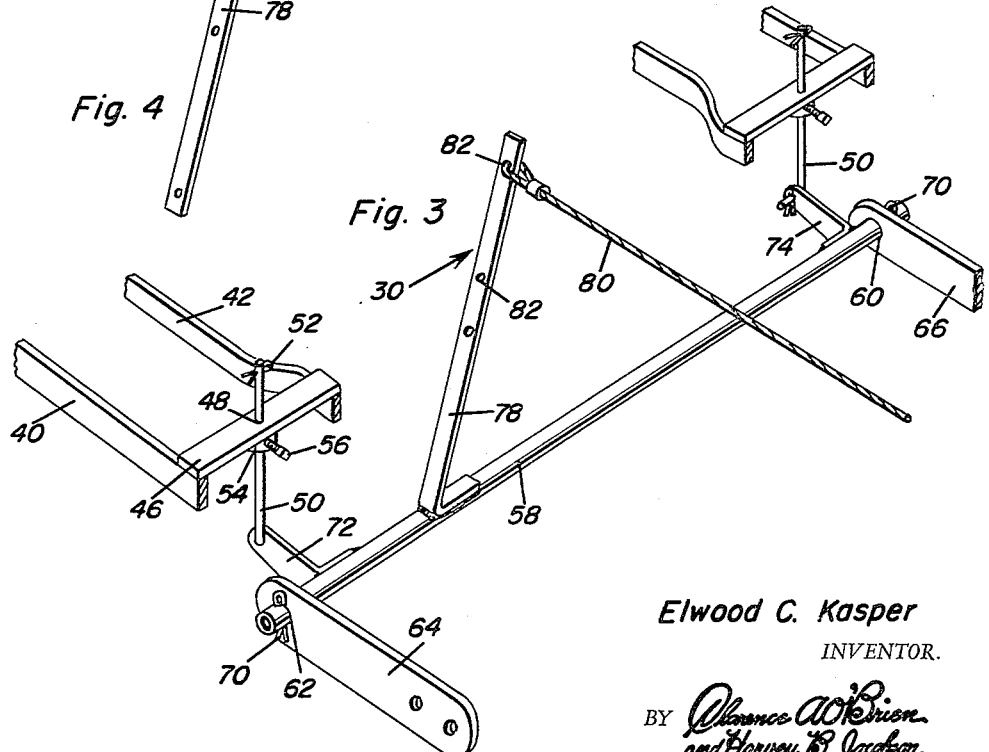
Fig. 3
Fig. 4
Elwood C. Kasper
INVENTOR.
BY Clarence A. O'Brien
and Harvey B. Jacobson
Attorneys

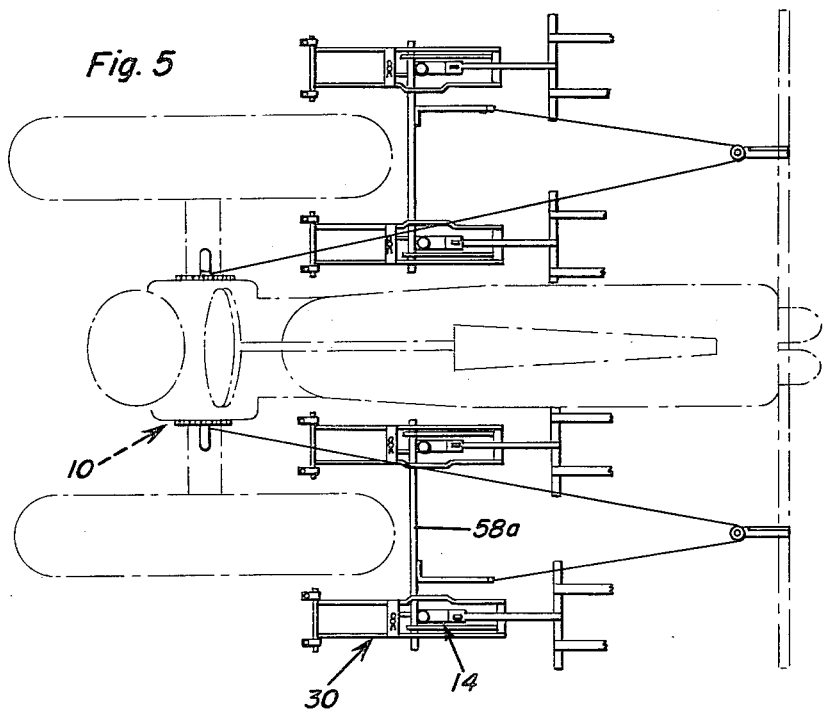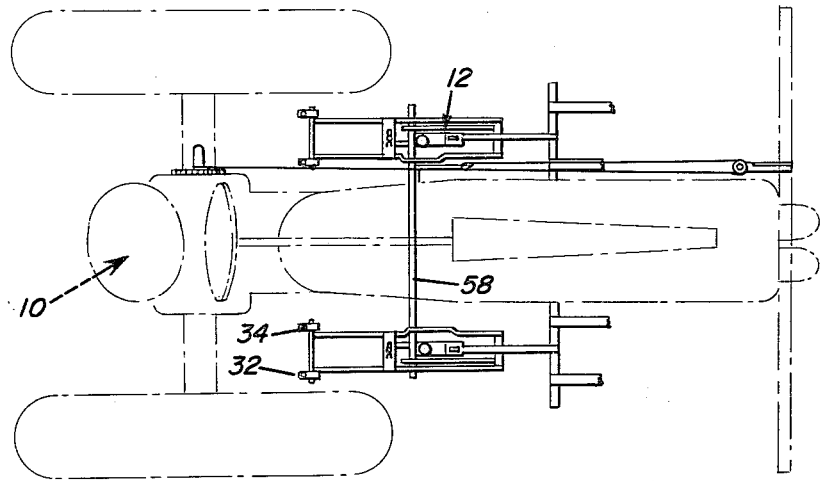

3,046,917
Patented July 31, 1962

1

3,046,917
PLANTER SHOVEL COVERER CONTROLS
Elwood C. Kasper, Rte. 1, Shiner, Tex.
Filed Oct. 15, 1959, Ser. No. 846,675
2 Claims. (Cl. 111—69)

This invention relates to agricultural equipment and more particularly to a manually controlled mechanical device for selecting the quantity of soil necessary to cover seeds which are planted in rows.

An object of the invention is to provide a very easily used attachment for a seeder which leaves the adjustment of a shovel or shovels for each of the seeders within the descretion of the tractor operator so that the amount of soil necessary to cover the seeds may be regulated.

The invention is particularly useful where planting is done in changing types of soil, that is, where there is more than one type of soil in the same field. For instance, when coming to heavier soils, the operator of the tractor may adjust the attachment to obtain proper seed coverage, and when lighter soils are encountered, the tractor operator makes a further adjustment, assuring correct coverage.

When planting, the planters have a tendency to ride up in heavier and sink lower in lighter soils. However, an attachment in accordance with this invention makes possible the covering of the seeds with the proper amount of soil regardless of the disposition and behavior of the planter.

An attachment such as to be more specifically described herein, is very useful when planting on sides of terraces where the soil from the upper side of the row has a tendency to come down in excess amounts. This excess soil is very easily controlled by the device.

Briefly, an attachment in accordance with the invention is designed to operate in conjunction with a conventional seeder. Of course, the seeder may be a two-row, four-row, etc., arrangement and the attachment will still have perfect utility therewith.

Considering a two- or four-row planter, each seed drop would have behind it a pair of shovels structurally mounted so that they are capable of up-and-down adjustment by a simple manipulation under the control of the tractor operator. The shovels are to the left and right of the seed drop and are arranged to spill soil over the seeds. Since the shovels are adjustable with respect to the seed drop and furrow opening plow of a conventional planter, the quantity of covering soil is regulated independently of the operation of the planter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the attachment and a part of the planter;

FIGURE 3 is a perspective view of a part of the attachment;

FIGURE 4 is a perspective view of a part of the attachment;

FIGURE 5 is a plan view of a tractor shown in dotted lines, the tractor equipped with a four-row planter arrangement and containing an appropriate attachment for each seed drop and associated mechanism thereof; and FIGURE 6 is a plan view of the same tractor as in FIGURE 5 but equipped with a two-row planting assembly and attachments therefor.

Figure 1:
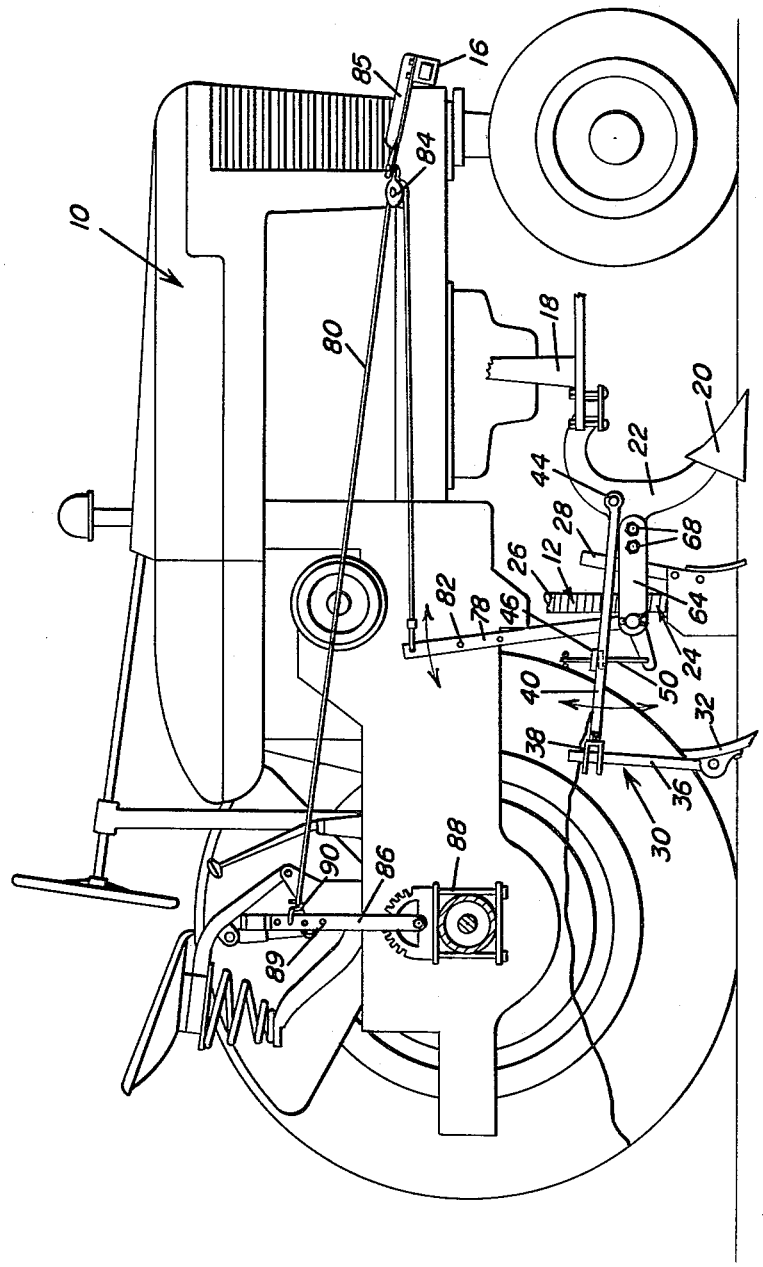
FIGURE 1 is a side elevational view of a planter mounted on a tractor and equipped with a soil cover control attachment typifying the invention.

In the accompanying drawings reference is first made to FIGURES 1, 5 and 6. Tractor 10 is absolutely conventional in all respects and is illustrated merely to show the setting of the invention. FIGURE 6 shows two-row planter 12 while FIGURE 5 shows four-row planter 14, this graphically showing that the principles of the invention are applicable in connection with planters for any number of rows. Typical planter 12 (FIG. 1) includes among other structure which is not shown because it is absolutely conventional and unaltered by the presence of the invention, tool bar 16 at the forward part of the tractor, planter frame 18 and furrow opening plow 20 on a plow support or shank 22 which depends from frame 18. Seed drop 24 has seed tube 26 connected with its upper end, and the seed drop is supported by bracket 28 to the mechanism of the seeder. The tube 26 is suspended in the usual manner from the seed hopper base (not shown) of the planter.

Attachment 30 is operatively connected with the seeder 12, and the attachment represents the improvement in accordance with the invention. There are two shovels 32 and 34 for the seed drop 24, and these can be considered part of planter 12, but the function thereof is altered so that they are properly considered as a part of attachment 30. The shovels themselves are conventionally shaped and constructed and they are supported by rods 36 rising upwardly from the shovels and connected by adjustable clamps 38 to the rear ends of arms 40 and 42 (see FIG. 3) which are spaced from each other and which extend forwardly to a pivot 44 which pivotally connects them to plow support or shank 22 in advance of the seed drop 12. Transverse member or bar 46 is welded or otherwise secured to the top edges of arms 40 and 42 and it has an aperture 48 between its ends. Push rod 50 extends through this aperture and has a key or pin 52 near its upper end and an adjustable collar 54 forming a stop in between its ends. Setscrew 56 carried by the collar 54 is adapted to engage the push rod 50 and hold the collar in selected adjusted positions along the length of the push rod. The collar contacts the bottom surface of member 46 to exercise a stop function.

Transverse shaft 58 is mounted for oscillatory movement in a pair of bearing openings 60 and 62 formed in side brackets 64 and 66 which are connected, for example by bolts 68 to bracket 22 in advance of the seed drop 12. Pins or keys 70 at the ends of the shaft 58 prevent the shaft from slipping out of its bearing openings, and as shown in FIGURE 6, shaft 58 extends transversely across the undercarriage of the tractor in a two-row arrangement. For the four-row arrangement, shaft 58a merely extends from one attachment to the other being located solely on one side of the tractor.

Crank arms 72 and 74 are welded or otherwise secured to the shaft 58 on the inboard sides of brackets 64 and 66. These have apertures into which the lower turned in ends of push rods 50 are disposed thereby pivotally connecting push rods 50 (one for each side) to the crank arms 72 and 74.

Control lever 78 is welded or otherwise secured to the shaft 58 and protrudes in a direction laterally from the longitudinal axis of shaft 58. Control cable 80 is attached in a selected aperture of a group 82 of apertures in lever 78 and is entrained around guide pulley 84 secured by bracket 85 to tool bar 16. The cable is also secured to a conventional locking-type lever assembly 86 connected by clamp 88 to the axle housing of the tractor. A group of apertures 89 are in lever assembly 86, and a hook 90 is engaged in a selected aperture 89. By adjustment of the control cable in the apertures of lever 78 and lever assembly 86, the stroke of movement of shaft 58 and consequently the motion of arms 40 and 42 are controllable.

FIGURE 5 is a four-row arrangement on tractor 10, and the only difference in attachment 30 is that there are two separate control cables and two separate lever assemblies adjacent to the seat of the tractor, plus the independence of operation brought about by the separate lever assemblies and control cables.

The operation of the invention remains the same regardless of the number of planters which it services. When the lever assembly 86 is moved in one direction, shaft 58 is turned thereby causing the stop 54 to contact member 46 and pivotally elevate arms 40 and 42. This results in a corresponding lifting movement on the shovels 32 and 34 so that the position thereof can be regulated independent of the operation of the seeders. Consequently, the desired amount of covering of the seeds, i.e., the proper amount, may be achieved. The resulting efficiency will be readily apparent to farmers since proper covering of the seed is essential for correct germination periods and a stronger and more productive and healthy crop.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use on a tractor-mounted planter including a plurality of furrow openers comprising shanks, plows mounted thereon and seed drop tubes rearwardly of said furrow openers, seed covering means comprising brackets fixedly mounted on the shanks and extending rearwardly therefrom and receiving the drop tubes therebetween, a rocker shaft journaled on said brackets, pairs of spaced, parallel, longitudinally extending arms straddling the drop tubes and having their forward end portions pivotally connected to the shanks for swinging movement in a vertical plane, pairs of seed covering shovels mounted on the free end portions of said arms rearwardly of the drop tubes, means for manually actuating the rocker shaft, and means operatively connecting said rocker shaft to intermediate portions of the arms for positively raising the shovels and permitting the same to be freely floating independently of the furrow openers, the last named means comprising transverse bars extending between intermediate portions of the pairs of arms and affixed thereto rearwardly of the drop tubes, arms affixed to the end portions of the shaft, upstanding push rods pivotally mounted on the second named arms and extending slidably through the bars, and collar means mounted for sliding adjustment on the rods and positioned beneath the bars for operatively connecting said push rods thereto.

2. For use on a tractor-mounted planter including a plurality of furrow openers comprising shanks, plows mounted thereon and seed drop tubes rearwardly of said furrow openers, seed covering means comprising brackets fixedly mounted on the shanks and extending rearwardly therefrom and receiving the drop tubes therebetween, a rocker shaft journaled on said brackets, pairs of spaced, parallel, longitudinally extending arms straddling the drop tubes and having their forward end portions pivotally connected to the shanks for swinging movement in a vertical plane, pairs of seed covering shovels mounted on the free end portions of said arms rearwardly of the drop tubes, means for manually actuating the rocker shaft, and means operatively connecting said rocker shaft to intermediate portions of the arms for positively raising the shovels and permitting the same to be freely floating independently of the furrow openers, the last named means comprising transverse bars extending between intermediate portions of the pairs of arms and affixed thereto rearwardly of the drop tubes, arms affixed to the end portions of the shaft, upstanding push rods pivotally mounted on the second named arms and extending slidably through the bars, and collar means mounted for sliding adjustment on the rods and positioned beneath the bars for operatively connecting said push rods thereto, the second named means including a lever fixed on the shaft, a hand lever pivotally mounted on the rear portion of the tractor for actuation by the operator thereof, a guide pulley mounted on the front end portion of the tractor, and a cable trained around said pulley and having its end portions adjustably connected to the levers.

References Cited in the file of this patent

UNITED STATES PATENTS

| | | |
|---|---|---|
| 719,575 | Ferriott | Feb. 3, 1903 |
| 1,053,341 | Adriance | Feb. 18, 1913 |
| 1,064,967 | Hackney | June 17, 1913 |
| 1,114,495 | Lusk | Oct. 20, 1914 |
| 1,386,407 | Hipple | Aug. 2, 1921 |
| 1,962,349 | Johnson | June 12, 1934 |
| 1,980,074 | Miller | Nov. 6, 1934 |
| 2,177,026 | Nightenhelser | Oct. 24, 1939 |
| 2,220,338 | Koebel | Nov. 5, 1940 |
| 2,249,807 | Brown | July 22, 1941 |
| 2,351,172 | White | June 13, 1944 |
| 2,694,356 | Haas | Nov. 16, 1954 |